United States Patent [19]

Hiyama

[11] Patent Number: 4,707,927
[45] Date of Patent: Nov. 24, 1987

[54] INCLINATION AND ACCELERATION SENSOR UTILIZING ELECTROSTATIC CAPACITIVE EFFECTS

[75] Inventor: Yasuhiro Hiyama, Higashimatsuyama, Japan

[73] Assignee: Diesel Kiki Co., Ltd., Tokyo, Japan

[21] Appl. No.: 838,473

[22] Filed: Mar. 11, 1986

[30] Foreign Application Priority Data

Mar. 18, 1985 [JP] Japan ................................. 60-53966

[51] Int. Cl.$^4$ ....................... G01C 9/06; G01P 15/125
[52] U.S. Cl. ................................. 33/366; 73/516 LM
[58] Field of Search ..................... 73/516 LM, 516 R; 33/366, 377; 361/284

[56] References Cited

U.S. PATENT DOCUMENTS 2,338,811  1/1944  Hasbrook ............................... 33/366
4,422,243 12/1983  Bronson et al. ........................ 33/366
4,528,851  7/1985  Ozols ............................... 73/516 LM Primary Examiner—John Chapman
Attorney, Agent, or Firm—Birch, Stewart, Kolasch & Birch

[57] ABSTRACT

A sensor includes a common electrode, and a plurality of detecting electrodes which are electrically independent from each other. The common electrode has a spherical shape. The detecting electrodes are arranged oppositely to the common electrode so as to form a spherical space between the common electrode and them. In the spherical space, a viscous fluid is housed so as to permit it to move freely therein. The viscous fluid moves according to the direction and angle of inclination or the direction and size of acceleration. By means of the movement of the viscous fluid, electrostatic capacity between the common electrode and each detecting electrode varies. The electrostatic capacity of each detecting electrode is detected by a detecting apparatus.

12 Claims, 8 Drawing Figures

INCLINATION AND ACCELERATION SENSOR UTILIZING ELECTROSTATIC CAPACITIVE EFFECTS

BACKGROUND OF THE INVENTION

The present invention relates to a sensor for detecting an inclination of an object or acceleration of an object.

An inclination sensor using mercury has been known. FIG. 1 shows a vertical section of a prior inclination detecting device, and FIG. 2 shows the A—A section of the inclination detecting device shown in FIG. 1. In these figures, reference numeral 1 is a spherically shaped container which is fixed to a base 2. Mercury 3 is disposed inside the container 1. The mercury 3 is always in contact with an electrode 4. The container 1 at its inner wall provides four contact electrodes 5a, 5b, 5c and 5d, as shown in FIG. 2. These contact electrodes 5a through 5d are designed so that, while the base 2 is in a horizontal status, none of the electrodes contact the mercury 3, and that, when the base 2 is inclined to a certain degree, a contact electrode in the inclined direction comes into contact with the mercury 3. The reference numeral 6 is a horizontal board set along the surface of mercury 3. When the base 2 is inclined to a certain degree, forward or backward, or rightward or leftward, a contact electrode located in the inclined direction comes into contact with the mercury 3. Therefore, the contact electrode which contacts with the mercury 3 produces a conduction path with the electrode 4 which is always in contact with the mercury 3. By turning a lamp on (not shown in the figure) corresponding to each contact electrode when conducting together with electrode 4, the inclined direction of an object in which this device is mounted can be known. This example has been shown in the Japanese Utility Model Laid Open Publication No. 50-31954.

However, the prior inclination detecting device has the disadvantages described below.

Since the inclination is detected by means of contact or non-contact between the contact electrode and the mercury, the detectable inclination angle is limited to a certain angle where any contact electrode and the mercury are in contact with each other. For inclination angles different from those above, the prior device is not useful.

Also, the direction of detectable inclination is limited, since the number of contact electrodes is limited.

SUMMARY OF THE INVENTION

It is an object, therefore, of the present invention to overcome the disadvantage and limitation of the prior inclination detecting device by providing a new and improved sensor.

Another object of the present invention is to provide a sensor which is capable of continuously detecting the inclination angle.

Still another object of the present invention is to provide a sensor which can detect inclination of all directions in two-dimensions.

Still another object of the present invention is to provide a sensor which can detect acceleration forces applied to an object.

The above and other objects are attained by a sensor comprising a spherically shaped common electrode; a plurality of detecting electrodes which are electrically independent from each other and arranged oppositely to the common electrode so as to form a spherical space between the common electrode and the detecting electrodes; means for housing a viscous fluid in the spherical space so as to permit it to move freely; and means for detecting each variation of the electrostatic capacity between the common electrode and each detecting electrode being accompanied with the movement of the viscous fluid.

BRIEF DESCRIPTION OF THE DRAWINGS

The foregoing and other objects, features and attendant advantages of the present invention will be clear as the same become better understood by means of the following description and accompanying drawings wherein.

DETAILED DESCRIPTION OF THE INVENTION

Figure 1:
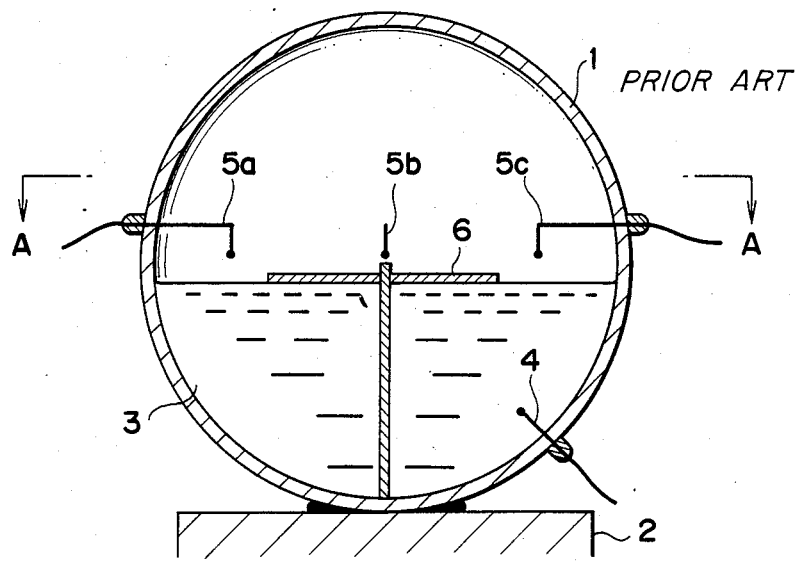
FIG. 1 is the vertical cross sectional view of a prior inclination detecting device.
Figure 2:
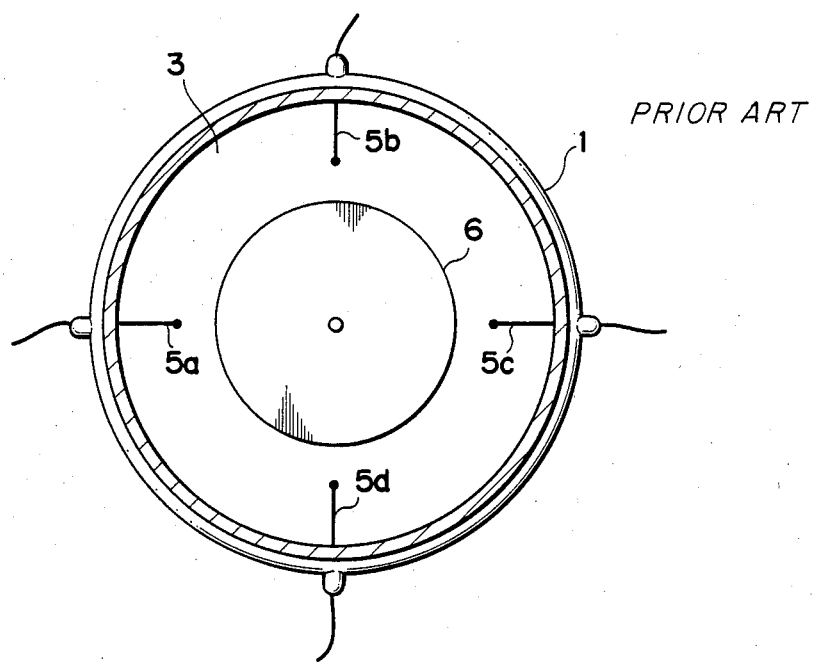
FIG. 2 is the A—A sectional view of the inclination detecting device shown in FIG. 1.
Figure 3:
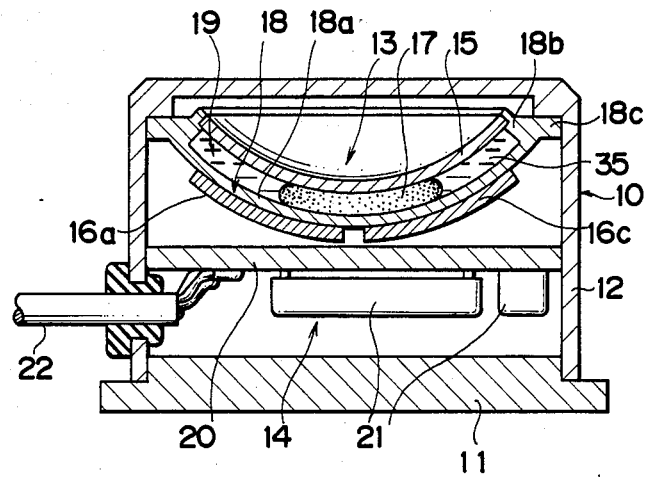
FIG. 3 is the vertical cross sectional view showing an embodiment of the sensor according to the present invention.
Figure 4:
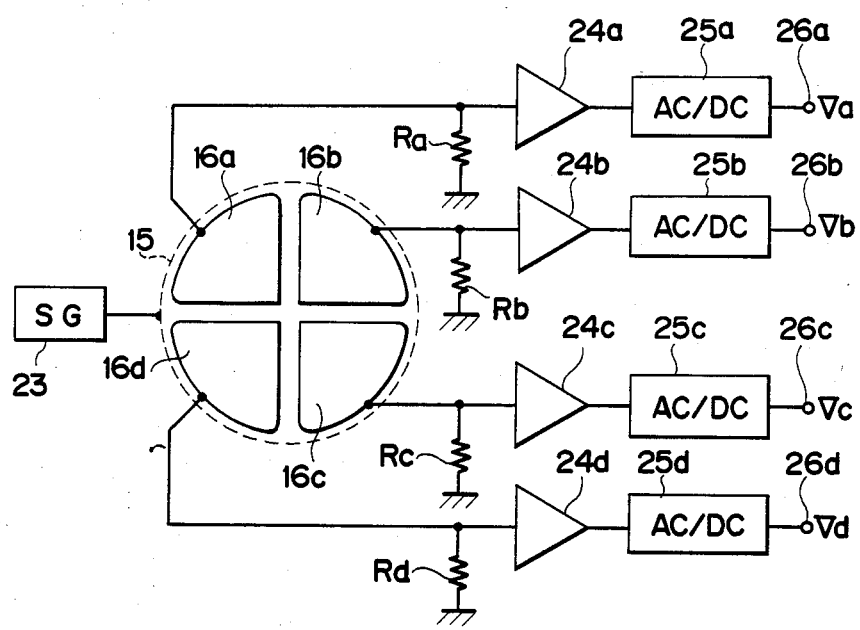
FIG. 4 is the composition drawing showing an example of the electrostatic capacity detecting means shown in FIG. 3, FIG. 5 and FIG. 6 are the explanatory drawings for the operation of the sensor shown in FIG. 3.

FIG. 3 shows an embodiment of the sensor according to the present invention, and FIG. 4 shows an electrostatic capacity detecting means of the sensor of FIG. 3. In FIG. 3, the reference numeral 10 is the sensor case. The sensor case 10 is formed with a plane base member 11 and a container member 12. The container member 12 has a closed upper face and at its bottom end is fixed on the base member 11. In the sensor case 10, there are housed a sensing means 13 and the electrostatic capacity detecting means 14.

The sensing means 13 includes a common electrode 15, four detecting electrodes 16a, 16b, 16c and 16d arranged oppositely to the common electrode 15, a magnetic fluid 17 inserted between the common electrode 15 and the detecting electrodes 16a through 16d, and an insulating member 18 for retaining the common electrode 15 and the detecting electrodes 16a through 16d and for housing the magnetic fluid 17. The common electrode 15 is spherically formed and, as shown in FIG. 3, its section presents a circular arc shape. The insulating member 18 has a spherical portion 18a formed with larger radius of curvature than that of the common electrods 15, with its section presenting a circular arc, a ring-shaped protruded portion 18b projecting inwards the spherical portion 18a, and a flange portion projecting outwards the spherical portion 18a. The insulating member 18, with its concave face up, is disposed horizontally in the container member 12. The insulating member 18 at its flange portion 18c is fixed to the inner wall of the container member 12. The common electrode 15, with the concave face up, is fixed to the protruded portion 18b of the insulating member 18 so that an enclosed spherical space 19 can be formed between the common electrode 15 and the spherical portion 18a of the insulating member 18. The detecting electrodes 16a through 16d are disposed on the surface of the convex side of the insulating member 18 so as to oppose the common electrode 15. The detecting electrodes 16a through 16d are, as shown in FIG. 4, radially separated into four parts from the center of the spherical portion 18a of the insulating member 18. The detecting electrodes 16a, 16b, 16c and 16d are electrically independent from each other. Each detecting electrode 16a, 16b, 16c and 16d has a shape fitting the convex face of the insulating member 18. These detecting electrodes 16a, 16b, 16c and 16d are all the same both in shape and size. Each of the detecting electrodes 16a, 16b, 16c and 16d and the common electrode 15 are composed so that the electrostatic capacity between each of the detecting electrodes 16a, 16b, 16c and 16d and the common electrode become equal when the sensing means 13 is in a horizontal status. The magnetic fluid 17 is inserted in the spherical space 19. The magnetic fluid 17, when the sensing means 13 is inclined, moves inside the spherical space 19. In a horizontal status shown in FIG. 3, the magnetic fluid 17 stays at the center part of the spherical space 19. Therefore, each electrostatic capacity between each of detecting electrodes 16a, 16b, 16c and 16d and the common electrode 15 become equal to each other. The magnetic fluid 17 is a colloid fluid with magnetic particles stably dispersed in a solvent. This magnetic fluid 17 has an inherent characteristic that it behaves as if the fluid itself possess magnetism, and viscosity suitable for making the fluid move according to inclination.

The variation of electrostatic capacity between the common electrode 15 and each of detecting electrodes 16a, 16b, 16c and 16d is detected by the electrostatic capacity detecting means 14. The electrostatic capacity detecting means 14 is housed in side the sensor case 10, by means of disposing circuit parts 21 on a printed circuit board 20 fixed inside the sensor case 10. The reference numeral 22 is a lead wire of the electrostatic capacity detecting means 14. Through this lead wire 22, signals corresponding to each of detecting electrodes 16a, 16b, 16c and 16d are output.

In FIG. 4, the common electrode 15 is shown with a broken line, and the detecting electrodes 16a through 16d with full lines. The common electrode 15 is connected to a signal generator 23. The signal generator 23 supplies a predetermined alternating voltage signal to the common electrode 15. Each of the detecting electrodes 16a, 16b, 16c and 16d is connected to detecting resistors Ra, Rb, Rc and Rd each grounded at one end, respectively. By this, the alternating voltage corresponding to the electrostatic capacity between each detecting electrode 16a, 16b, 16c and 16d and the common electrode 15 is detected as voltage across each detecting resistor Ra, Rb, Rc and Rd. Each of the detecting resistors Ra, Rb, Rc and Rd is connected to AC/DC converters 25a, 25b, 25c and 25d via amplifiers 24a, 24b, 24c and 24d, respectively. By this, direct current voltage signals Va, Vb, Vc and Vd, corresponding to the electrostatic capacity of detecting electrodes 16a, 16b, 16c and 16d, are supplied to the output terminals 26a, 26b, 26c and 26d of AC/DC converters 25a, 25b, 25c and 25d, respectively. The output terminals 26a, 26b, 26c and 26d are connected to the lead wire 22.

Figure 5:
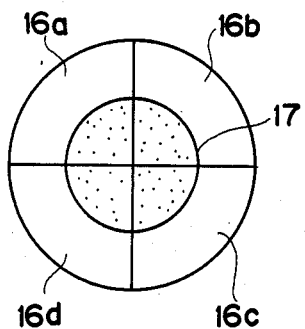

When the sensing means 13 is placed horizontally, as shown in FIG. 3, the magnetic fluid 17 stays at the center part of the spherical space 19. In this status, the magnetic fluid 17 evenly covers each of the detecting electrodes 16a, 16b, 16c and 16d, as shown in FIG. 5. Therefore, the electrostatic capacity between the common electrode 15 and each detecting electrode 16a, 16b, 16c and 16d become equal to one another, and the voltage signals Va, Vb, Vc and Vd become equal.

Figure 6:
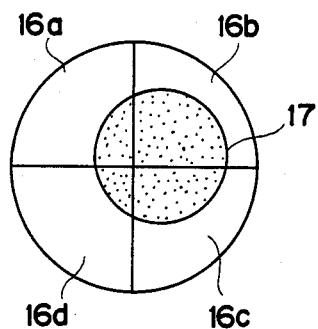

When the sensing means 13 becomes inclined as the sensor case 10 is inclined, the magnetic fluid 17 moves towards the inclined direction, as shown in FIG. 6. This results in the change of the covering ratio of the magnetic fluid 17 to each detecting electrode 16a, 16b, 16c and 16d. Consequently, as the electrostatic capacity between the common electrode 15 and each of the detecting electrodes 16a, 16b, 16c and 16d varies according to the covering ratio of the magnetic fluid 17, the values of voltage signals Va, Vb, Vc and Vd vary. Therefore, by means of the variation of each voltage signal Va, Vb, Vc and Vd, the inclined direction as well as the inclination angle can be detected continuously.

Figure 7:
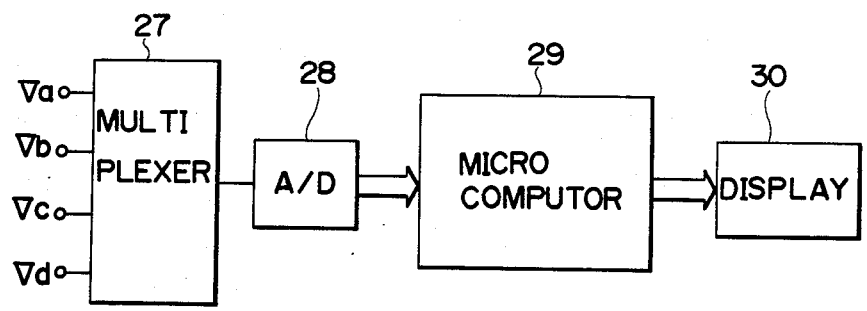
FIG. 7 is a drawing showing a system for processing the output signal of the electrostatic capacity detecting means.

FIG. 7 shows an example of system for processing the output signals of the electrostatic capacity detecting means. The voltage signals Va, Vb, Vc and Vd of the electrostatic capacity detecting means 14 are input through a multiplexer 27 and an A/D converter 28 to a microcomputer 29. The microcomputer 29, based on the input voltage signals, computes the inclined direction and the inclination angle. Based on these inclined direction and inclination angle computed, the inclination of an object is displayed on the displaying device 30.

Figure 8:
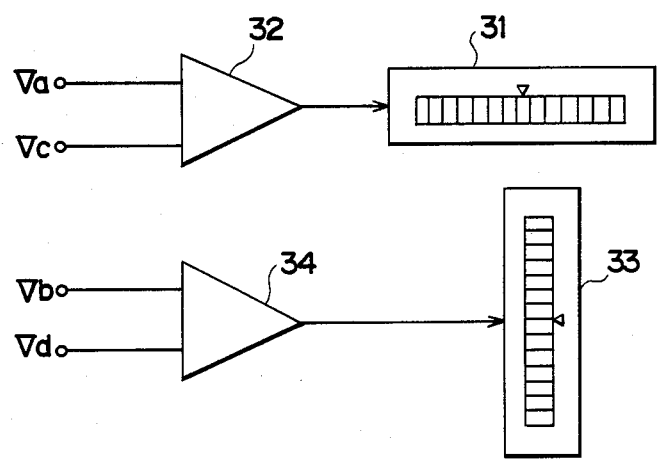
FIG. 8 is a drawing showing another system for processing the output signal of the electrostatic capacity detecting means.

FIG. 8 shows another example of system for processing the output signals of the electrostatic capacity detecting means. This indicates the amount of inclination in the before-and-after direction and that in the right-and-left direction separately. The first indicator 31 indicates the amount of inclination in the right-and-left direction. The indicator 31 is driven by the differential output of a differential amplifier 32 to which the voltage signals Va and Vc of the electrostatic capacity detecting means 14 are input. The second indicator 33 indicates the amount of inclination in the before-and-after direction. The indicator 33 is driven by the differential output of the differential amplifier 32 to which the voltage signals Vb and Vd of the electrostatic capacity detecting means 14 are input.

The detecting electrode does not necessarily require to be divided into four equal parts. For example, when the inclination to be detected is only in the before-and-after direction or in the right-and-left direction, two detecting electrodes can be used.

In the empty portion of the spherical space 19, it is possible to fill another fluid 35 which does not mix with the magnetic fluid 17. This fluid functions as a damper against the movement of the magnetic fluid 17. Therefore, even in the case of vehicles in which the sensor is used under a vibrating environment, it is possible to control the magnetic fluid 17 from its positional error, and thereby a more stable detecting can be effected.

The fluid to be filled in the spherical space 19 is not necessarily required to be a magnetic fluid. Any viscous fluid, which provides a viscosity suited for performing movement according to inclination, and can vary the electrostatic capacity between electrodes, may be substituted for a magnetic fluid.

The sensor shown in FIG. 3, as composed therein, is also capable of detecting acceleration. In FIG. 3, when the sensor is not accelerated, the magnetic fluid 17 stays at the center part of the spherical space 19. Therefore, the electrostatic capacity between the common electrode 15 and each of the detecting electrodes 16a, 16b, 16c and 16d become equal to each other. When acceleration force is given, the magnetic fluid 17 moves towards a direction opposite from the direction of acceleration, with displacement according to the size of acceleration. Therefore, the electrostatic capacity between the common electrode 15 and each of the detecting electrodes 16a, 16b, 16c and 16d vary according to the direction and size of acceleration. Therefore, based on the voltage signals Va, Vb, Vc and Vd of the electrostatic capacity detecting means 14, the direction and size of acceleration can be known.

As described above in detail, according to the present invention, it is possible to provide a sensor which can detect continuously both the inclination angle and all inclined directions in two-dimension, and further, can detect the direction and size of acceleration.

From the foregoing it will now be apparent that a new and improved sensor has been invented. It should be understood of course that the embodiments disclosed are merely illustrative and are not intended to limit the scope of the invention. Reference should be made to the appended claims, therefore, rather than the specification as indicating the scope of the invention.

What is claimed is:

1. A sensor comprising:
    a spherically shaped common electrode;
    insulating member means, including a spherical portion facing said common electrode at regular intervals, for forming an enclosed spherical space by said spherical portion and said common electrode, said spherical space being a circular arc shape in its vertical shape and having a regular space width between an upper and lower spherical surface of said spherical space, said spherical portion having a uniform thickness;
    dielectric viscous fluid, having a large surface tension, being contained in said spherical space and filling a part of said spherical space, said dielectric viscous fluid being able to move in a body in said spherical space in close contact with the upper and lower spherical surfaces of said spherical space;
    a plurality of detecting electrodes which are electrically independent from each other, being arranged on the outer surface of said spherical portion along said insulating member means, said detecting electrodes having a spherical shape fitting the outer surface of said spherical portion; and
    detecting means for detecting each variation of electrostatic capacity between the common electrode and each detecting electrode according to the movement of the dielectric viscous fluid.

2. A sensor according to claim 1, wherein said detecting electrodes are equal-sized fan-shaped electrodes which are arranged radially from a vertical axis passing through the centers of said spherical portion and said common electrode.

3. A sensor according to claim 1, wherein said insulating member means includes a ring-shaped protruded portion which forms the peripheral wall of said spherical space, and wherein a peripheral end portion of said common electrode is fixed to said protruded portion.

4. A sensor according to claim 1, wherein the viscous fluid is a magnetic fluid.

5. A sensor according to claim 1, wherein a fluid which does not mix with the viscous fluid is filled in an empty portion of the spherical space.

6. A sensor according to claim 1, wherein said detecting means comprises;
    a signal generator which applies a predetermined AC voltage signal to said common electrode;
    four resistors being inserted between said detecting electrodes and ground, one resistor corresponding to each detecting electrode, and providing four AC voltages, one corresponding to each electrostatic capacity between said common electrode and each of said detecting electrodes;
    output means, receiving said four AC voltages, for converting said AC voltages into four DC voltage signals each DC voltage signal having a corresponding detecting electrode.

7. A sensor according to claim 1, wherein said sensor is housed in a sensor case, and wherein when said sensor case is placed in a non-inclined position, said viscous fluid concentrates at the center part of the spherical space, and the electrostatic capacity between said common electrode and each detecting electrode become equal to one another.

8. A sensor comprising:
    a spherically shaped common electrode;
    insulating member means for forming an enclosed spherical space with said spherically shaped common electrode and having a spherical portion with a uniform thickness;
    dielectric fluid disposed in said spherical space and filling said spherical space so as to be in close contact wtih a portion of an interior wall of said insulating member means and said spherically shaped common electrode;
    a plurality of detecting electrodes being disposed at an exterior surface of said insulating member means, said plurality of detecting electrodes having a spherical shape that corresponds to a spherical shape of said insulating member means; and
    means for detecting a variation of electrostatic capacity between said spherically shaped common electrode and each of said plurality of detecting electrodes wherein the electrostatic capacity varies in accordance with movement of the dielectric fluid.

9. The sensor of claim 8 further comprising means for minimizing positional error of said dielectric fluid, said means for minimizing including a second fluid, disposed in said spherical space with said dielectric fluid, said second fluid not mixing with said dielectric fluid.

10. The sensor of claim 8, wherein said dielectric fluid is viscous and has a large surface tension.

11. The sensor of claim 8, wherein said detecting means comprises:
    signal generator means for applying a predetermined AC voltage signal to said spherically shaped common electrode;
    means for detecting a plurality of AC voltage signals, each AC voltage signal being indicative of an electrostatic capacity between a corresponding one of said plurality of detecting electrodes and said spherically shaped common electrode; and
    output means for converting said plurality of detected AC voltage signals into a plurality of DC voltage signals.

12. The sensor of claim 11 further comprising:
    means for computing direction of incline and inclination angle from said plurality of DC voltage signals; and
    means for displaying computations produced by said means for computing.

* * * * *